United States Patent [19]

Eriksson et al.

[11] Patent Number: 4,739,819
[45] Date of Patent: Apr. 26, 1988

[54] LEVEL MEASUREMENT USING A RADIATION SOURCE

[75] Inventors: Jan-Erik Eriksson, Mörarp; Ingvar Thorn-Andersen, Helsingborg, both of Sweden

[73] Assignee: Asea AB, Västerås, Sweden

[21] Appl. No.: 804,688

[22] Filed: Dec. 4, 1985

[30] Foreign Application Priority Data

Jan. 7, 1985 [SE] Sweden ............................. 8500053

[51] Int. Cl.⁴ .............................................. B22D 2/00
[52] U.S. Cl. ...................................... 164/150; 164/449
[58] Field of Search ................ 164/4.1, 150, 154, 155, 164/413, 414, 449, 451–455, 468, 504

[56] References Cited

U.S. PATENT DOCUMENTS 2,743,492 5/1956 Easton .................................. 164/449

FOREIGN PATENT DOCUMENTS 63072 10/1982 European Pat. Off. ............ 164/150
58-205666 11/1983 Japan ................................... 164/449

Primary Examiner—Nicholas P. Godici
Assistant Examiner—Richard K. Seidel
Attorney, Agent, or Firm—Kenyon & Kenyon

[57] ABSTRACT

A device for sensing the free surface level of melt in a continuous casting mold having an electromagnetic stirrer consisting of stirrer coils and magnetic poles therefor disposed around the circumference of the mold. The device is characterized in that at least one elongated radiation source extending in the direction of casting is arranged on one side of the mold, and that a detector for the radiation with a small extension in the casting direction is arranged on substantially the diametrically opposite side of the mold but at a height different from that of the radiation source. In the radiation path from the source to the detector an oblong slot is provided for the passage of the radiation through the pole of a stirrer coil.

2 Claims, 3 Drawing Sheets

LEVEL MEASUREMENT USING A RADIATION SOURCE

TECHNICAL FIELD

This invention relates, in general, to the continuous casting of metallic materials and in particular to an improved device for monitoring the level of the free surface of molten metal in the mold of a continuous casting plant manufactureing, for example, billets, blooms or slabs.

DISCUSSION OF PRIOR ART

In a continuous casting plant, molten metal poured into the mold of the plant is subjected to electromagnetic stirring as the melt cools in the mold to form the cast string. It is important to control the level of melt in the mold and to do this, some device is required which is capable of sensing the position of the free surface of the melt in the mold without seriously disturbing the electromagnetic stirring of the melt. To obtain good electromagnetic stirring, it is conventional practice to surround the mold at least throughout the length which contains unsolidifed melt, with stirrer coils. The level monitoring device thus has to be accommodated in a space left free of the stirrer coils.

Melt level monitoring devices for the above-mentioned use often comprise a source of radiation on one side of the mold and a detector for that radiation on the other side of the mold.

European patent publication No. 0 063 072 describes one type of melt-level monitoring device, in which a radioactive source is positioned outside the mold with its stirrer and transmits its radiation towards a detector on the radially opposite side of the mold. At least one slot is provided in the iron core of the stirrer to allow a sufficiently high intensity of radiation to pass through the mold and its melt and thereby obtain a measure of the level of melt in the mold. The coils, which form the stirrer, thus have to be disposed unsymmetrically around the mold in the vicinity of the desired free surface level of the melt. Normally, a mold stirrer for, for example, billets (such as billets of round cross-section) consists of a number of coils, for example six, which are symetrically disposed in a toroidal or other configuration around the mold. The above-mentioned unsymmetrical coil location affects the stirring efficiency and does not provide fully satisfactory level measurements.

The detector and/or radiation source used for free-surface level sensing are preferably positioned on a level with the highest point of the melt, and this poses a problem, since it has proved to be necessary to lower the height of the stirrer thus reducing the efficiency of the stirring at the highest point of the melt.

To solve the above-mentioned problems it has been proposd to arrange, around the mold, a stirrer with toroidal or other energising coils, in which recesses in the form of apertures have been provided in the coils for the detector and the radiation source. Such recesses improve the possibilities of making accurate level measurements.

One object of the present invention is to provide an alternative solution to the prior art problems of making level measurements in continuous casting molds.

SUMMARY OF THE INVENTION

The invention is characterized in that at least one elongated radiation source extending in the casting direction is arranged outside the stirrer and a detector with a smaller extension in the casting direction is arranged on substantially the diametrically opposite side of the mold-stirrer, but at a height different from that of the radiation source. An elongated (e.g. oblong) slot is provided in a magnetic pole of the stirrer, the slot being located in the radiation path from the source to the detector.

In the present invention a linear transmitter/radiation source and a small, suitably point-sized radiation detector are used. By the term "magnetic pole" is meant that part of the iron core which is occupied by a coil of the stirrer. By placing the detector and the radiation source at mutually different heights in relation to the free surface of melt in the mold, the length of the radiation source can be reduced.

By providing a slot in the magnetic core where the rays pass, losses in radiation intensity due to passage through the magnetic core, are avoided. By providing a slot in the magnetic pole in this way, the coil pitch for the stirrer coils (coil-wound or overlapping-wound) arranged around the periphery of the mold can be retained. Thus, it is possible to use an elongated radiation source in the magnetic core and a small detector above the magnetic core on the opposite side of the mold.

BRIEF DESCRIPTION OF THE DRAWINGS

The invention will now be further described, by way of example, with reference to the accompanying drawings, in which.

DESCRIPTION OF PREFERRED EMBODIMENT

Figure 1:
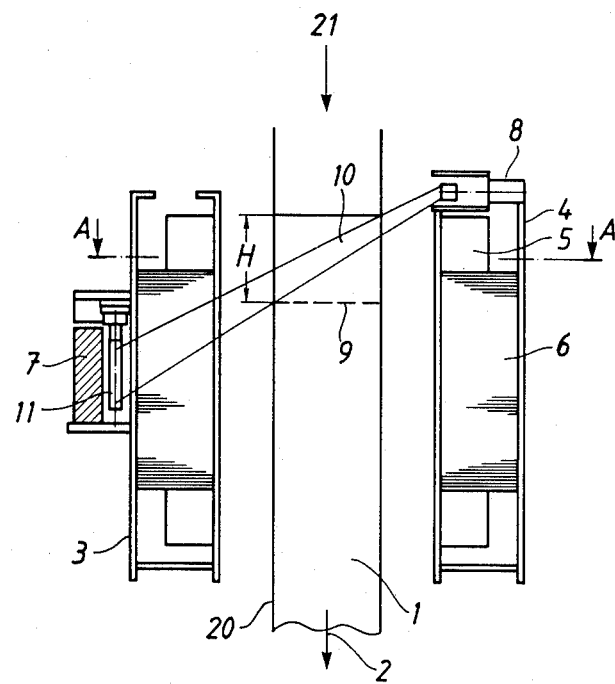
FIG. 1 is a schematic representation, in vertical side section, of a melt-level sensing device according to the invention.

Referring to FIG. 1, a case strand 1 of metallic material is formed continuously in a casting mold 20 by the addition (at 21) of melt into the open top of the mold 20 and moves downwardly in the casting direction 2. A surrounding wall 3 of the casting mold serves in part to confine a liquid coolant (e.g. water) around the mold 20 and also to contain an electromagnetic stirrer 4 employed to circulate melt within the mold 20 as the melt solidifies to form the strand 1. The stirrer 4 comprises one or more copper coils 5 and an associated annular iron core 6.

To sense the level of the free surface 9 of the melt in the mold 20 use is made of a beam 10 of radiation (e.g. gamma rays) emanating from a radioactive source 11 partially encased in a protective lead shield 7. The source 11 is elongated in the casting direction 2 and the beam 10 is directed across the mold 20 from one side to the opposite side.

A detector 8, sensitive to the radiation in the beam 10, is located above the stirrer 4 and is of limited extent in the casting direction so that the part of the emitted beam 10 which is used for sensing melt level is inclined upwardly through the mold 20 and narrows in the direction away from the source 11. The detector can be of very small extent and can approach a point detector.

Figure 2:
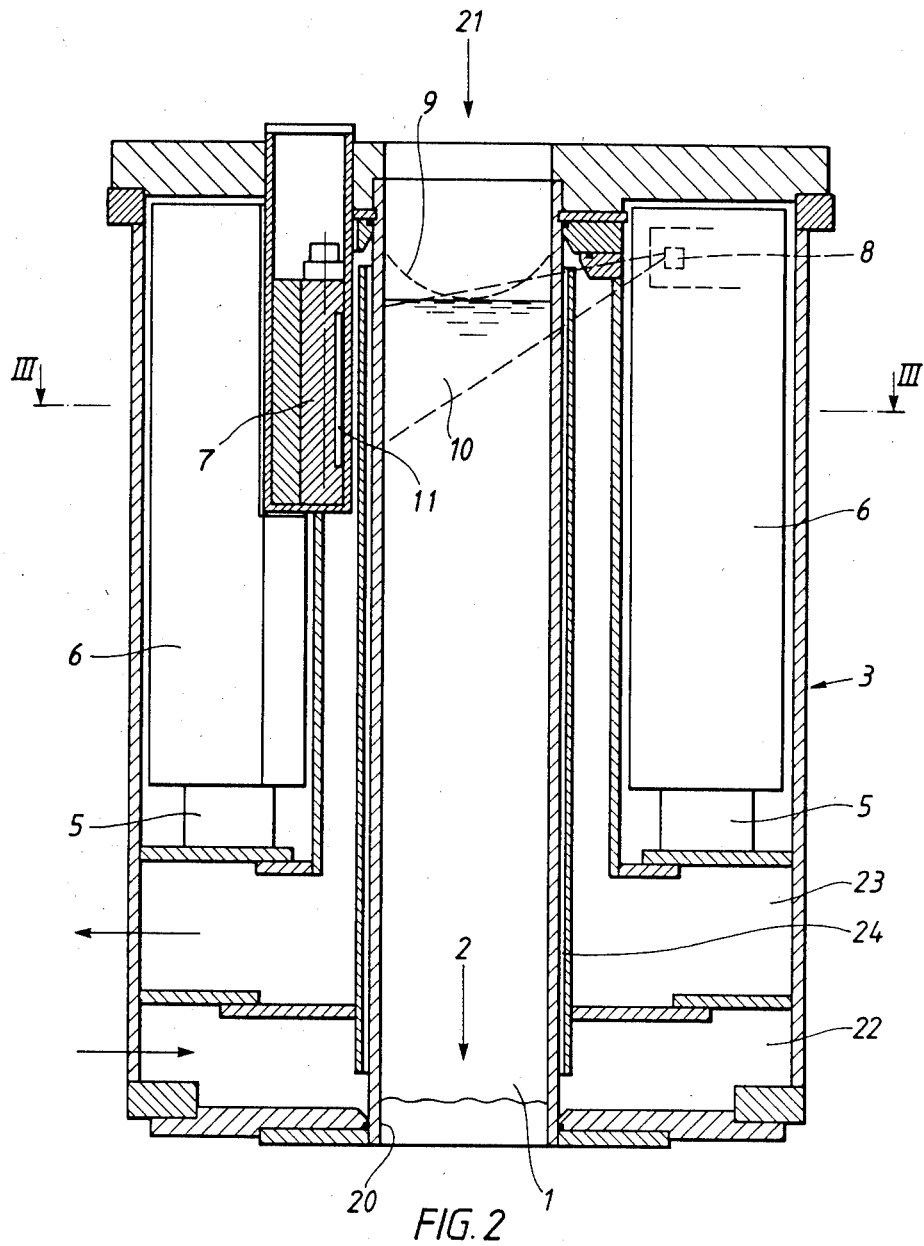
FIG. 2 is a sectional side elevation through part of a continuous casting plant taken on the line II—II of FIG. 3.
Figure 3:
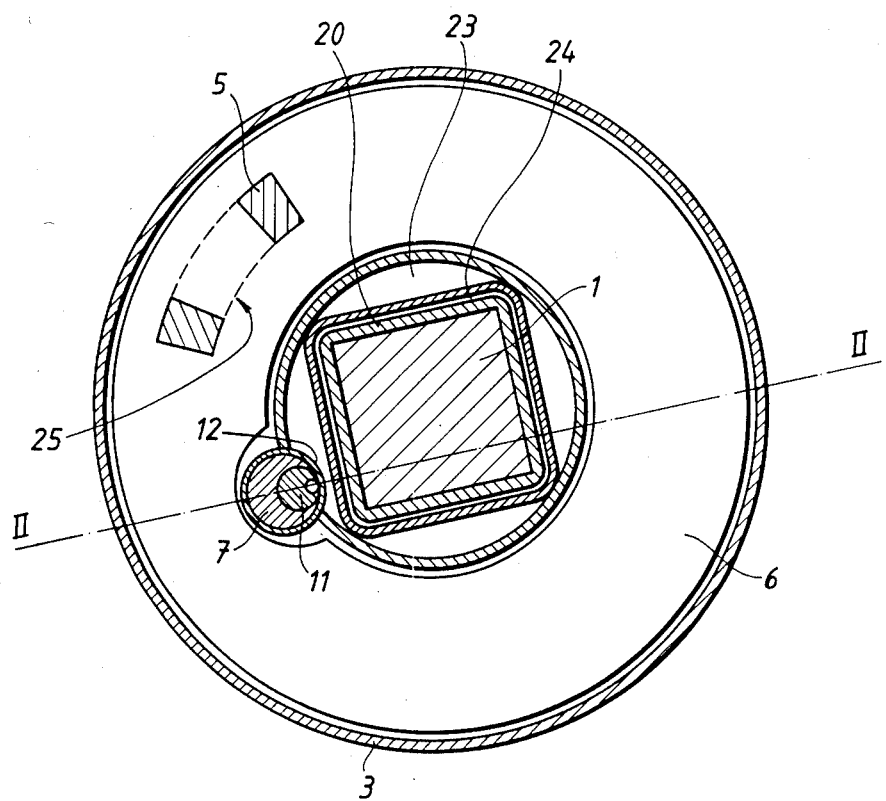
FIG. 3 is a sectional plan view of the plant of FIG. 2 taken on the line III—III thereof.

The free surface 9 of the melt will assume a somewhat curved shape (as shown in FIG. 2) due to the stirring, and the extent to which this free surface intersects the beam 10 will determine the intensity of radiation which reaches the detector 8.

Referring to FIG. 2, the wall 3 encloses an annular coolant inlet chamber 22 and an annular coolant outlet chamber 23. In flowing from chamber 22 to chamber 23, the coolant is made to flow through a narrow annular passage 24 where it extracts heat from the mold 20.

FIG. 2 shows just one of the coils 5 employed in the stirrer 4 and it will be noted that the lead lined container housing the source 11 is located radially inside the inner surfaces 25 of the coils 5.

Suitably the mold wall 20 is of copper and is of substantially rectangular section, the radiation path through the mold 20 running substantially parallel to one straight side of the mold.

By locating the radiation source 11 and the detector 8 at different heights, the length of the radiation source can be reduced without restricting the range of free surface levels which can be detected with the device. This range is indicated by "H" in FIG. 1. A slot 12, through which the radiation 10 is allowed to pass, is thus provided in the pole of the iron core 6 in that part of the iron core which is radially inside the radially inner surfaces of the coils 5. By placing the detector and the radiation source at different heights, also the extent to which the iron core needs to be slotted is reduced. If these two elements 11 and 8 were to be positioned at the same height in the mold, the length of the radiation source 11 would have to be made considerably greater to embrace the same range H of levels.

The melt level monitoring device described above can be varied in many ways within the scope of the following claims.

What is claimed is:

1. In a continuous casting plant having a continuous casting mold receiving a melt forming a melt level which moves downwardly in the mold in a casting direction, an electromagnetic stirrer on the outside of the mold and having a core with a portion which extends in said direction, and a melt level detector on the outside of the mold and including a source of radiation opposite one side of the mold and directing radiation through the mold across the level of the melt in the mold to a radiation detector on the other side of the mold and outside of the mold; wherein the improvement comprises said radiation source being elongated in said casting direction and said core portion having a slot that is elongated in said direction and provides clearance for the radiation from said elongated source to said detector, and said detector is substantially point-sized and positioned at a level higher than said radiation source.

2. The continuous casting plant of claim 1 in which said slot has an oblong shape.

* * * * *